US006630050B1

(12) United States Patent
Moeller et al.

(10) Patent No.: US 6,630,050 B1
(45) Date of Patent: Oct. 7, 2003

(54) POLYURETHANE ADHESIVE

(75) Inventors: Thomas Moeller, Duesseldorf (DE); Ingo Gensch, Linnich (DE); Herbert Fischer, Duesseldorf (DE); Norbert Huebner, Duesseldorf (DE); Hermann-Josef Plum, Juelich (DE); Bernhard Herlfterkamp, Bottrop (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/509,363

(22) PCT Filed: Sep. 15, 1998

(86) PCT No.: PCT/EP98/05841

§ 371 (c)(1), (2), (4) Date: May 24, 2000

(87) PCT Pub. No.: WO99/15573

PCT Pub. Date: Apr. 1, 1999

(30) Foreign Application Priority Data

Sep. 24, 1997 (DE) .......................... 197 42 216

(51) Int. Cl.⁷ .............................. C08G 18/72; C09J 5/00
(52) U.S. Cl. .................................... 156/331.7; 524/591
(58) Field of Search .................. 156/331.7; 524/591

(56) References Cited

U.S. PATENT DOCUMENTS

| | | | | |
|---|---|---|---|---|
| 3,930,102 A | * | 12/1975 | Müller et al. ............ | 156/331.7 |
| 4,061,618 A | * | 12/1977 | Stanley et al. ............ | 524/591 |
| 4,442,259 A | | 4/1984 | Isgur et al. | |
| 4,740,534 A | | 4/1988 | Matsuda et al. | |
| 4,925,732 A | | 5/1990 | Driskill et al. | |
| 5,891,580 A | * | 4/1999 | Fricke et al. ............ | 156/331.7 |
| 6,399,735 B1 | * | 6/2000 | Fischer et al. ............ | 524/591 |

FOREIGN PATENT DOCUMENTS

| DE | 42 42 687 | 6/1994 |
|---|---|---|
| WO | WO94/13726 | 6/1994 |

OTHER PUBLICATIONS

Etikettiertechnik von A bis Z (1987) p. 503–507 No translation.

* cited by examiner

*Primary Examiner*—Sam Chuan Yao
(74) *Attorney, Agent, or Firm*—Stephen D. Harper; Daniel S. Ortiz

(57) ABSTRACT

The invention relates to a contact adhesive based on a polyurethane of at least one diisocyanate and at least one low molecular weight polyethylene glycol, the polyethylene glycol having a molecular weight of up to 2,000 and the polyurethane having a degrees of crystallization of less than 20%. The contact adhesive can be applied from the melt or from an aqueous solution or dispersion. Surprisingly, it is suitable not only for polar plastic surface, but above all for PE and PP surfaces and of course for paper. Accordingly, the contact adhesive is preferably useful for applying paper labels to PE bottles.

21 Claims, No Drawings

POLYURETHANE ADHESIVE

This application is filed under 35 U.S.C. 371 and based on PCT/EP98/005841, filed Sep. 15, 1998.

BACKGROUND OF THE INVENTION

Field of the Invention

This invention relates to an adhesive based on a polyurethane of at least one diisocyanate and at least one polyethylene glycol of low molecular weight, to its production and to its use.

Discussion of Related Art

An adhesive based on these components is known. Thus, a high molecular weight nonionic water-soluble polyurethane is described in WO 94/13726. The high molecular weight is reflected in the specific viscosity of at least 0.4 (1% aqueous solution at 20° C.) and in the melt viscosity of more than 3 Pas at 175° C. (Epprecht). The high solubility in water is reflected by the virtually unlimited mixing ratio at 20° C. Another important characteristic is its melting point of 60 to 80° C. and its degree of crystallization of 20 to 80%, as measured by DSC and based on the degree of crystallization of commercially available, relatively long-chain polyethylene glycol, particularly polyethylene glycol 6000. The known polyurethane can be produced from a diisocyanate and a polyethylene glycol with a degree of polymerization n of 8 to 500. The polyethylene glycol may also be partly replaced by hydrophobic diols, for example by polypropylene glycol. The known polyurethane may be used as an adhesive whether in the form of a hotmelt or in the form of an aqueous dispersion or solution. Above all, it may be used to bond paper, particularly labels and wall coverings. The bonds obtained are strong and can be redissolved by exposure to water or heat (ca. 60 to 80° C.). The properties required for numerous applications are thus satisfied.

However, there is also a need for adhesives which are permanently tacky and remain tacky and which adhere to almost all substrates under light pressure. In particular, there is an increasing demand for such contact adhesives for polyolefin-based packs, more particularly for polyethylene- and polypropylene-based packs. Adhesives such as these should also be soluble in water in the interests of better disposal. In addition, particular economy and easy handling are of course expected.

DESCRIPTION OF THE INVENTION

The solution provided by the invention is defined in the claims and consists essentially of an adhesive based on a polyurethane of A) at least one diisocyanate and
B) at least one low molecular weight polyethylene glycol, the polyethylene having a molecular weight $M_z$ of up to 2,000 and the polyurethane having a degree of crystallization of less than 20%. The degree of crystallization is preferably less than 15%, based on the degree of crystallization of commercial polyethylene glycol 6000 as standard. The degree of crystallization is determined by the DSC method (see Examples). The degree of crystallization can be influenced through the type and quantity of diols and diisocyanates used, more particularly through the molecular weights of the polyethylene glycol units.

The viscosity of a 50% by weight aqueous solution is above 10,000 and, preferably, above 20,000 mPas at 22° C., as measured by the Brookfield method (for further particulars, see Examples).

For the polyurethanes according to the invention, the Epprecht melt viscosity at 110° C. is above 5 and, more particularly, above 30 Pas.

The adhesive according to the invention is permanently tacky, at least for 6 months, under normal climatic conditions (20° C./65% relative air humidity) in the same way as a contact or pressure-sensitive adhesive. However, the adhesive according to the invention may also be used like a dispersion or solvent-based adhesive, i.e. the water or the solvent need not be removed before bonding. In contrast to those adhesives, however, it remains tacky, i.e. for example the bond can be dissolved and then re-established simply by pressing the substrates together without the adhesive having to be activated.

The adhesive strength is at least sufficient to hold writing paper on vertical walls, even in the dry state, when the adhesive is applied in a quantity of at least 50 g/m².

The isocyanates are compounds with the general structure O=C=N—X—N=C=O, where X is an aliphatic, alicyclic or aromatic radical and the aliphatic or alicydic radical contains 4 to 18 carbon atoms. An aromatic diisocyanate, preferably MDI, should be used. Up to 50% by weight may be usefully replaced by aliphatic or alicyclic diisocyanates, more particularly TMXDI. Examples of suitable isocyanates are 1,5-naphthylene diisocyanate, 4,4'-diphenylmethane diisocyanate (MDI), 2,4'-diphenylmethane diisocyanate or isomer mixtures of MDI, hydrogenated MDI ($H_{12}$MDI), xylylene diisocyanate (XDI), tetramethyl xylylene diisocyanate (TMXDI), 4,4'-diphenyl dimethyl-methane diisocyanate, di- and tetraalkyl diphenylmethane diisocyanate, 4,4'-dibenzyl diisocyanate, 1,3-phenylene diisocyanate, 1,4-phenylene diiso-cyanate, the isomers of toluene diisocyanate (TDI), 1-methyl-2,4-diisocyanatocyclohexane, 1,6-diisocyanato-2,2,4-trimethyl hexane, 1,6-diiso-cyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoro-ethane, tetramethoxybutane-1,4-diisocyanate, butane-1,4-diisocyanate, hexane-1,6-diisocyanate (HDI), dicyclohexylmethane diisocyanate, cyclo-hexane-1,4-diisocyanate, ethylene diisocyanate, phthalic acid-bis-isocyanato-ethyl ester; diisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates are obtained, for example, by reaction of 2 moles of hexamethylene diisocyanate with 1 mole of thiodiglycol or dihydroxydihexyl sulfide. Other important diisocyanates are trimethyl hexamethylene diisocyanate, 1,4-diisocyanatobutane, 1,12-diisocyanatododecane and dimer fatty acid diisocyanate. Particularly suitable diisocyanates are tetramethy-lene, hexamethylene, undecane, dodecamethylene, 2,2,4-trimethylhexane, 1,3-cyclohexane, 1,4-cyclohexane, 1,3- and 1,4-tetramethyl xylene, isophorone, 4,4-dicyclohexanemethane and lysine ester diisocyanate. Mixtures may also be used.

The solubility of the polyurethane in water is largely attributable to the groups of the polyethylene ether —[$CH_2CH_2$—O—]$_n$—, where n is a number which corresponds to a molecular weight $M_z$ of up to 2,000, preferably in the range from 150 to 1,500, more preferably in the range from 200 to 900 and most preferably in the range from 300 to 600 g/mole. These structural units are derived from the polyethylene glycols used as diols. However, polyethylene glycol in the context of the invention not only encompasses polyadducts of ethylene oxide with water or ethylene glycol as starting molecule, but also polyadducts with other dihydric alcohols, for example butanediol, hexanediol, 4,4'-dihydroxydiphenyl propane and 2,4,7,9-tetramethyl-5-decine-4,7-diol. Several polyethylene glycols with different average molecular weights may also be used.

In a preferred embodiment, the polyethylene glycol with a molecular weight of up to 2,000 is partly replaced by at least one polyol from the following group:

a) to a level of up to 50%, by a block or statistical copolymer or ethylene oxide, b) to a level of preferably up to 20%, by a hydrophobic aliphatic or cycloaliphatic diol alone, c) by hydrophobic homopolymeric polyalkylene glycols, the alkylene group containing more than 2 carbon atoms; by up to 10% for $C_3$ alkylene groups and by up to 20% for $C_4$ alkylene groups, d) to a level of up to 40%, by polyethylene glycol with a molecular weight of more than 2,000 to 40,000, e) to a level of up to 5%, by alcohols of relatively high functionality and f) to a level of up to 5%, by ion-forming diols.

The percentages shown represent % by weight, based on the diols. Hydrophobic aliphatic or cycloaliphatic diols alone are preferably added.

Besides the polyethylene glycol with a molecular weight $M_z$ of up to 2,000, block or statistical copolymers of ethylene oxide, for example with propylene oxide, may also be used. In all, they make up from 0 to 50% by weight, preferably from 0.5 to 30% by weight, more preferably from 0.7 to 20% by weight and most preferably from 1 to 10% by weight of the diols. Specific examples are block copolymers of ethylene oxide (EO) and propylene oxide (PO) which correspond to the following general constitutional formula:

$$HO(CH_2CH_2O)_x(CHCH_3-CH_2-O)_y(CH_2CH_2O)_zH$$

where x and z are in general approximately equal. X, z and y are selected so that the molecular weight of the polypropylene oxide block and the percentage of polyethylene oxide in the molecule as a whole produce, for example, the following combinations: 950/10, 1100/30, 1750/10, 1750/20, 1750/40, 1750/80, 2300/10, 2750/20, 2750/40, 3250/10 and 3250/50. Block copolymers with a central molecule element of ethylene oxide and side elements of propylene oxide are possible. For example, the molecular weight of the polypropylene oxide part may be 2500 g/mole and the percentage of polyethylene oxide in the molecule 20%. In another example, the corresponding numbers are 3100 g/mole and 10%. Substances such as these are commercially available under the name Pluronic PE and RPE. Similar products are available under the name DOWFAX. The molecular weight of the hydrophobic polypropylene oxide block of these block copolymers is greater than 900, the total molecular weight being in the range from 2,000 to 5,000. The percentage by weight of polyethylene oxide is in the range from 10 to 40%.

Preferably up to 20%, more preferably up to 10% and most preferably up to 5% of the polyethylene glycol may be replaced by diols which contain a hydrophobic residue and which have a solubility in water of at least 2 g/100 g water. The hydrophobic residue Y of the structural unit —O—Y—O— consists of aliphatic or alicyclic structures preferably containing 2 to 44 and more preferably 6 to 36 carbon atoms. The residues may also contain aromatic structures. The position of the two OH groups may have a certain importance, i.e. for the thickening or adhesive properties. Diols containing at least one primary OH group are preferred, α,ω-diols being particularly preferred. The hydrocarbon chain may be branched or unbranched.

In addition, up to 10% and preferably 0.5 to 5% of the polyethylene glycol may be replaced by hydrophobic homopolymeric polyalkylene glycols, the alkylene group containing more than 2 and preferably 3 and 4 carbon atoms. Their molecular weights are in particular 150 to 10,000 g/mole.

Specific examples of the hydrophobic diols containing pure CH residues and ether groups are polypropylene glycol (PPG), polybutylene glycol, polytetrahydrofuran, polybutadienediol, hydroxyl-terminated ethylene/butylene copolymers (for example KRATON LIQUID Polymer L-2203), hydrogenated polybutadienediol and alkanediols containing 4 to 44 carbon atoms. Preferred hydrophobic diols are polypropylene glycol, polytetrahydrofuran with a molecular weight of 150 to 10,000, preferably 200 to 4,500 and more preferably 250 to 1,000, 1,10-decanediol, 1,12-dodecanediol, 1,12-octadecanediol, dimer fatty acid diol, 1,2-octanediol, 1,2-dodecanediol, 1,2-hexadecanediol, 1,2-octadecanediol, 1,2-tetradecanediol, 4,4'-isopropylidene dicydohexanol and isomer mixtures, 4,8bis(hydroxymethyl) tricyclo[$5,2,1,0^{2.6}$]-decanes and isomer mixtures, 1,4:3,6-dianhydro-D-mannitol, 1,4:3,6-dianhydro-D-sorbitol, 1,16-hexadecanediol, bisphenol A and propoxylation and/or ethoxylation products thereof, more particularly with up to 30 moles EO, and finally monofatty acid esters of glycerol with fatty acids containing up to 22 carbon atoms, for example glycerol monoesters of behenic acid, oleic acid, stearic acid, myristic acid. Mixtures of the hydrophobic diols may of course also be used.

Up to 40% of the polyethylene glycol may be replaced by polyethylene glycol with a molecular weight $M_z$ of more than 2,000 to 40,000, more particularly in the range from 2,500 to 12,000 and above all in the range from 3,000 to 6,000.

In addition, 0 to 5% and, more particularly 0.2 to 2% of the polyethylene glycol may be replaced by alcohols of relatively high functionality, more particularly by triols, for example by glycerol, trimethylol propane, triethanolamine or ethoxylated or propoxylated variants thereof. Pentaerythritol may also be used. Ethoxylated or propoxylated variants of amines or aminoalcohols, for example starting from ethylenediamine, diethylenetriamine, and higher homologs thereof, aminophenol, N-2-aminoethyl piperazine, are also possible.

Up to 5% by weight of the polyethylene glycol may be replaced by ion-forming diols, for example by dimethylol propionic acid, N-alkyl diethanol-amine or the quatemized form thereof.

The diols mentioned are all known and, for the most part, may also be routinely acquired as commercial chemicals.

If a high molecular weight polyurethane is to be obtained, the purity of the diols is of course an important factor. Thus, the content of alkali and alkaline earth metal ions should be less than 500 ppm, preferably less than 150 ppm and more preferably. less than 10 ppm. In addition, the water content should be below 0.5% by weight, preferably below 0.1% by weight and more preferably below 0.05% by weight, as determined by the K. Fischer method. In special cases, the water content may even be below 0.03% by weight.

The molar ratio of diol to diisocyanate should be of the order of 1:1 in order to obtain a high molecular weight. The molar ratio is generally in the range from 2 to 0.5, preferably in the range from 1.5 to 0.7, more preferably in the range from 1.2 to 0.9 and most preferably in the range from 1.15 to 1.0:1.

In general, NCO groups are not wanted in the end product. However, NCO groups may be used in order, for example, to introduce hydrophobic or ionic structural elements.

Hydrophobic structural elements may also be obtained by reaction of NCO-terminated oligomers with monools or monofunctional amines containing $\geq 2$ carbon atoms, more particularly $\geq 6, \geq 10$ or $\geq 16$ carbon atoms. Specific examples are polyethylene/butylene containing one OH group, for example with an OH equivalent weight of 3,600 (Kraton L 1203), 1-hexanol, 1-heptanol, 1-octanol, 1-nonanol, 1-decanol, 1-undecanol, 10-undecen-1-ol, 1-dodecanol, 1-tridecanol, 1-tetradecanol, 1-pentadecanol, 1-hexadecanol, 1-heptadecanol, 1-octadecanol, 9cis-octadecen-1-ol, 9-trans-octadecen-1-ol, 9-cis-octadecen-1, 12-diol, all-cis-9,12,-octadecadien-1-ol, all-cis-9,12,15-octadecatrien-1-ol, 1-nonadecanol, 1-eicosanol, 9-cis-eicosen-1-ol, 5,8,11,14eicosatetraen-1-ol, 1-heneicosanol, 1-docosanol, 13-cis-docosen-1-ol, 13-trans-docosen-1-ol.

The corresponding fatty amines may also be used as hydrophobicizing structural elements.

Another method of introducing ion-forming structural elements is to react OH-terminated oligomers with dicarboxylic anhydrides. These may contain in all 2 to,44 and preferably 2 to 12 carbon atoms between the bis- acyl groups as an alkylene, alkenylene or arylene group. Specific examples are succinic anhydride, glutaric anhydride, 1,2,3,6-tetrahydrophthalic anhydride and isomers, phthalic anhydride, trimellitic anhydride, 7-oxabi-cyclo[2,2]hept-5-ene-2,3-dicarboxylic anhydride, 5-norbomene-2,3-dicarboxylic anhydride and isomers, cis4-cyclohexene-1,2-dicarboxylic anhydride and isomers, diglycolic anhydride, maleic anhydride, dimethyl maleic anhydride, citraconic anhydride, itaconic anhydride; alkenyl succinic anhydrides, preferably those of which the alkenyl groups contain more than 2 carbon atoms, more preferably more than 5 and, most preferably, more than 7 carbon atoms. Specific examples are n-ctenyl succinic anhydride, n-dodecenyl succinic anhydride, tetrapropenyl succinic anhydride, n-hexadecenyl succinic anhydride and n-octadecenyl succinic anhydride. The alkenyl chain may be linear or branched. In addition, mixtures of alkenyl groups with different numbers of carbon atoms may also occur. Mixtures of several anhydrides are also possible, although cyclic anhydrides are preferred.

Finally, another method of introducing ion-forming structures is to react NCO-terminated oligomers with hydroxycarboxylic acids or aminocarboxylic acids containing alkylene, alkenylene or arylene groups, as in the case of the dicarboxylic anhydrides. Examples include glycolic acid, lactic acid, caproic acid and mandelic acid and also aminocaproic acid, aminododecanoic acid, glycine, alanine and phenyl alanine.

Where importance is attributed to a particularly high molecular weight, chain extension should be carried out in known manner by first preparing prepolymers with excess diisocyanate and then extending them with short-chain diols or diamines or with water. Specific examples of chain-extending agents include:

the usual saturated and unsaturated glycols, such as ethylene glycol or condensates of ethylene glycol, 1,3-butanediol, 1,4-butanediol, 2-butene-1,4-diol, 2-butine-1,4-diol, butenediol, 1,2-propanediol, 1,3-propanediol, neopentyl glycol, hexanediol, bis-hydroxymethyl cyclohexane, dioxy-ethoxyhydroquinone, terephthalic acid-bis-glycol ester, succinic acid di-2-hydroxyethylamide, succinic acid di-N-methyl2-hydroxyethyl)-amide, 1,4-di2-hydroxymethylmercapto)-2,3,5,64etrachlorobenzene, 2-methylene-1,3-propanediol, 2-methyl-1,3-propanediol; 3-pyrrolidino-1,2-propanediol, 2-methylene-2,4-pentanediol, 3-alloxy-1,2-propanediol, 2-ethylhexane-1,3-diol, 2,2-dimethyl-1,3-propanediol, 1,5-pentanediol, 2,5-dimethyl-2,5-hexanediol, 3phenoxy-1,2-propanediol, 3benzyloxy-1,2-propanediol, 2,3-dimethyl-2,3-butanediol, 3-(4-methoxyphenoxy)-1,2-propanediol and hydroxymethyl benzyl alcohol.

Aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine, diaminodiphenyl methane or the isomers of phenylenediamine. Carbohydrazides or hydrazides of dicarboxylic acids may also be used.

Aminoalcohols, such as ethanolamine, propanolamine, butanolamine, N-methyl ethanolamine, N-methyl isopropanolamine; diethanolamine, triethanolamine and di- or tri(alkanolamines).

Aliphatic, cycloaliphatic, aromatic and heterocyclic mono- and diamino-carboxylic acids, such as glycine, 1- and 2-alanine, 6-aminocaproic acid, 4-aminobutyric acid, the isomeric mono- and diaminobenzoic acids, the isomeric mono- and diaminonaphthoic acids.

The polyurethanes according to the invention may be produced both by a single-stage process and by a two-stage process. In the two-stage process, a prepolymer is first prepared by partly reacting the polyols, for example the hydrophilic polyols, with the diisocyanate. The next polyol is then added. The polyurethane may also be produced by initially reacting or partly reacting the polyols with the diisocyanate. The synthesis is then continued with one or more other diisocyanates.

However, the polyurethane according to the invention is preferably produced by a single-stage process. In this process, all the starting materials are initially mixed in the presence of an organic solvent, but preferably in the absence of an organic solvent, at a water content of less than 0.5% by weight. The mixture is heated for about 1 to 30 hours to a temperature of 70 to 200° C., more particularly to a temperature of 75 to 150° C., preferably to a temperature of 80 to 110° C. and more preferably to a temperature of 85 to 100° C.

The reaction time can be shortened by the presence of catalysts. Particularly suitable catalysts are tertiary amines, for example triethylamine, 1,4-diazabicyclo[2,2,2]octane (=DABCO), dimethyl benzylamine, bis-dimethylaminoethyl ether and bis-methylaminomethyl phenol. 1-Methyl imidazole, 2-methyl-1-vinyl imidazole, 1-allyl imidazole, 1-phenyl imidazole, 1,2,4,5-tetramethyl imidazole, 1(3-aminopropyl)-imidazole, pyrimidazole, 4-dimethylaminopyridine, 4-pyrrolidinopyridine, 4-morpholinopyridine, 4-methyl pyridine, are particularly suitable.

Organotin compounds may also be used as the catalysts. Organotin compounds are understood to be compounds which contain both tin and an organic residue, more particularly compounds which contain one or more Sn-C compounds. Organotin compounds in the broader sense include, for example, salts, such as tin octoate and tin stearate. Tin compounds in the narrower sense include above all compounds of tetravalent tin with the general formula $R_{n+1}SnX_{3-n}$, where n is a number of 0 to 2, R is an alkyl group or an aryl group and, finally, X is an oxygen, sulfur or nitrogen compound. R preferably contains at least 4 carbon atoms and, in particular, at least 8 carbon atoms. The upper limit is generally at 12 carbon atoms. Preferably, n=0 or 1 and a combination of 1 and 0. X is preferably an oxygen compound, i.e. an organotin oxide, hydroxide, carboxylate or ester of an inorganic acid. However, X may also be a sulfur compound, i.e. an organotin sulfide, thiolate or thioacid ester. Among the Sn-S compounds, thioglycolic acid esters above all are of interest, for example compounds containing the following residues:

—S—CH$_2$—CH$_2$—CO—O—(CH$_2$)$_{10}$CH$_3$ or

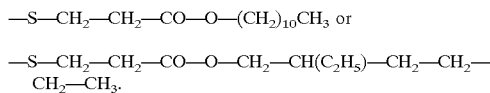

Compounds such as these satisfy another selection criterion: the molecular weight of the organotin compound should preferably be above 250 and, more particularly, above 600.

A preferred class of compounds are the dialkyl tin(IV) carboxylates (X=O—CO—R$^1$). The carboxylic acids contain 2, preferably at least 10 and more preferably 14 to 32 carbon atoms. Dicarboxylic acids may also be Used. The following are expressly mentioned as acids: adipic acid, maleic acid, fumaric acid, terephthalic acid, phenyl acetic acid, benzoic acid, acetic acid, propionic acid and, in particular, caprylic, capric, lauric, myristic, palmitic and stearic acid. Specific examples are dibutyl tin diacetate and dilaurate and dioctyl tin diacetate and dilaurate. Tin oxides and sulfides and thiolates may also be used with advantage. Specific compounds are bis-(tributyl tin)oxide, dibutyl tin didodecyl thiolate, dioctyl tin dioctyl thiolate, dibutyl tin bis(thioglycolic acid-2ethylhexyl ester), octyl tin-tris (thioglycolic acid-2ethylhexyl ester), dioctyl tin bis (thioethylene glycol-2-ethylhexoate), dibutyl tin bis (thioethylene glycol laurate), dibutyl tin sulfide, dioctyl tin sulfide, bis(tributyl tin)sulfide, dibutyl tin bis(thioglycolic acid-2-ethylhexyl ester), dioctyl tin bis(thioglycolic acid-2-ethylhexyl ester), octyl tin tris(thioglycol acid-2-ethylhexyl ester), dioctyl tin bis(thioethylene glycol-2-ethylhexoate), tributyl and dibutyl tin bis(thioethylene glycol laurate), dioctyl tin dodecyl thiolate, dioctyl tin bis(thioethylene glycol-2-ethylhexoate), trioctyl tin thioethylene glycol-2-ethylhexoate) and dioctyl tin bis(thiolatoacetic acid-2ethylhexyl ester), bis(ss-methoxycarbonylethyl) tin bis (thiolatoacetic acid-2-ethylhexyl ester), bis(ss-acetylethyl) tin bis(thiolatoacetic acid-2-ethylhexyl ester), tin(II) octyl thiolate and tin(II) thioethylene glycol-2-ethylhexoate. Other examples are dibutyl tin diethylate, dihexyl tin dihexylate, dibutyl tin diacetyl acetonate, dibutyl tin diethyl acetyl acetate, bis(butyl dichlorotin)oxide, bis(dibutyl chlorotin)sulfide, tin(II) phenolate, tin(II) acetyl acetonate; other β-dicarbonyl compounds are acetyl acetone, dibenzoyl methane, benzoyl acetone, ethyl acetoacetate, n-propyl acetoacetate, ethyl α,y-diphenyl acetoacetate and dehydraacetic acid.

The catalyst is preferably added to the polyol. The quantity in which it is used is determined by its activity and by the reaction conditions and is preferably in the range from 0.001 to 0.5% by weight, based on the polyol.

However, the reaction is preferably carried out in the absence of a catalyst. The solvent, too, is also preferably omitted. Solvents in the present context are understood to be inert organic liquids with a boiling point below 200° C. at normal pressure.

By virtue of the solubility of the polyurethanes according to the invention in water, solutions or dispersions can be prepared very easily, for example by adding water at a temperature below 100° C., stirring until the mixture is homogeneous and cooling the mixture with stirring to 20° C. In some cases, it may be advisable to add solubilizers, for example high-boiling solvents, or surfactants, such as anionic surfactants, cationic surfactants, nonionic surfactants or amphoteric surfactants, to the solutions for the purposes of stabilization. The quantity in which the solubilizer is used is between 0.01 and 100% by weight and preferably between 0.05 and 20% by weight, based on the polyurethane solution. Specific examples are quaternary ammonium compounds with the general formula: $(R_4N^+)$ $X^-$, for example dimethyl distearyl ammonium chloride and imidazolinium compounds or alkyl arylene sulfonates (for example dodecyl benzenesulfonate), alkane sulfonates, olefin sulfonates, alkyl sulfates, ampholytes, betaines, fatty alcohol ether sulfates, α-ester sulfonates, alkyl phosphates, alkyl ether phosphates, amine oxides, sugar surfactants, condensation products of protein hydrolyzates and fatty acids, sulfosuccinates, soaps, for example resin soaps, glycols, polyethylene glycol, sugars, glycerol and glycol ethers, alkyl polyglycosides, tributyl phosphate, polyvinyl alcohol, polyvinyl pyrrolidone, polyvinyl methyl ether, maltodextrins, the dextrose equivalent being greater than 2, preferably greater than 5 and above all greater than 10, sorbitol, 2,4,7,9-tetramethyl-5-decine4,7-diol and ethoxylation products thereof, glycerol monoesters of fatty acids containing up to 22 carbon atoms, for example with behenic acid, oleic acid, stearic acid and myristic acid, EO/PO adducts of bisphenol A, triacetin and saccharin.

Nonionic surfactants are particularly important. Nonionic surfactants in the context of the invention are compounds which consist of one or more hydrophobic groups and one or more nonionic hydrophilic groups. The hydrophobic groups are preferably optionally substituted hydrocarbon radicals. Examples of nonionic hydrophilic groups are polyethylene oxide or polyglycerol groups. Suitable nonionic surfactants are, for example, fatty alcohol ethoxylates, alkylphenol ethoxylates, fatty acid amide ethoxylates, fatty acid amine ethoxylates, alkoxylated triglycerides containing OH groups, alk(en)yl oligoglycerides, fatty acid glucamides or partial esters of polymerized glycerol, ethoxylated castor oil containing 20 to 400% by weight and preferably 40 to 200% by weight of EO, based on non-ethoxylated castor oil, or epoxidized soybean oil ring-opened with alcohols or carboxylic acids which, after ring-opening, are reacted with alkylene oxides, preferably ethylene oxide, up to an alkylene oxide content of 20 to 400% by weight and preferably 40 to 200% by weight, based on the non-alkoxylated starting product. The surfactants according to the invention have hydroxyl values of 10 to 200 and preferably in the range from 30 to 100.

The following nonionic surfactants are particularly suitable: EO adducts with linear or branched monools containing 6 to 44, preferably 6 to 22 carbon atoms and up to 50 EO units, more particularly up to 30 EO units. Specific examples are oleyl/cetyl alcohol 2EO, oleyl/cetyl alcohol 5EO, oleyl/cetyl alcohol 10EO, oleyl/cetyl alcohol 7EO, tall oil fatty acid 3EO, tall oil fatty acid 5.5EO, castor oil 5EO, castor oil 11EO, castor oil 20EO, castor oil 40EO, $C_{12-18}$ fatty alcohol 2EO, $C_{12-18}$ fatty alcohol 3EO, $C_{12-18}$ fatty alcohol 5EO, $C_{12-18}$ fatty alcohol 6.5EO, $C_{12-18}$ fatty alcohol 7EO, $C_{16-18}$ fatty alcohol 5EO, $C_{16-18}$ fatty alcohol 10EO, $C_{16-18}$ fatty alcohol 12 EO, $C_{16-18}$ fatty alcohol 14EO, $C_{16-18}$ fatty alcohol 20EO, $C_{16-18}$ fatty alcohol 29EO, $C_{16-18}$ fatty alcohol 30EO, decyl alcohol 3EO, octyl alcohol 4EO, $C_{8-14}$ fatty alcohol 4EO, $C_{12-18}$ fatty alcohol 9EO, $C_{20}$ Guerbet alcohol 2EO, $C_{20}$ Guerbet alcohol 5EO, decyl alcohol 3EO, $C_{10-14}$ fatty alcohol 6EO, $C_{12-14}$ fatty alcohol 2EO, $C_{12-14}$ fatty alcohol 3EO, $C_{12-14}$ fatty alcohol 4EO, $C_{16-18}$ fatty alcohol 8EO, $C_{16-18}$ fatty alcohol 11EO.

Other suitable nonionic surfactants are EO/PO adducts with linear or branched monools, fatty acid ethanolamides and ethoxylated or propoxylated variants thereof, the already mentioned EO/PO copolymers such as, for example, "Pluronic" and DOWFAX and polypropylene glycol ethers, for example mono, di- and tripropylene glycol monoethers or methanol, ethanol, propanol and n-butanol and of phenol. Ethylene glycol phenyl ether may also be used. Mixtures of these agents may of course also be used.

Antioxidants may be added to the polymers or their solutions to provide protection against oxidative changes. In addition, preservatives may be added to protect the aqueous solution against contamination by microorganisms. Other suitable additives are plasticizers, resins, defoamers, UV stabilizers, viscosity controllers, fragrances, dyes, fillers, dispersions and polymer solutions of polyacrylates, polyacrylamides, polyvinyl pyrrolidone, polyvinyl acetates, ethylene/vinyl acetate copolymers, polybutadienes, polyisoprenes and copolymers with styrene, more particularly copolymers of butadiene, ethylene and styrene, polychloroprenes, modified polysaccharides such as, for example, carboxymethyl celluloses, methyl celluloses, hydroxyethyl cellulose and carboxymethyl starch. The quantities in which such additives are used vary within wide limits, i.e. from 0.01 to 100% by weight and, more particularly, from 0.01 to 30% by weight, based on the polyurethane solution.

However, the most important additive is water. It provides for easy application. The water content of the aqueous system, i.e. solution or dispersion, may be up to 98% by weight and is preferably in the range from 20 to 80% by weight and more preferably in the range from 30 to 70% by weight, based on the contact adhesive.

The adhesive according to the invention is preferably applied from an aqueous system. However, it may also be applied from the melt or from an organic solution.

A general formulation for an aqueous adhesive system comprises the following components in the quantity ranges shown: 30 to 90% of polyurethane according to the invention, 0 to 35% of dispersion adhesives, 0 to 10% of solubilizers, 0 to 10% of viscosity controllers, 0 to 5% of filler, 0 to 2% of defoamer, up to 0.5% of preservative and, for the rest, water.

A general formulation for use as a pressure-sensitive hotmelt adhesive comprises 50 to 100% by weight of polyurethanes according to the invention, 0 to 30% by weight of tackifiers and 0 to 30% by weight of waxes.

The adhesives according to the invention are particularly suitable for bonding paper, particularly paper labels, to plastic surfaces. Suitable plastics are, in particular, those which have a surface energy of less than 35 $mJm^{-2}$, of which specific examples are polystyrene, polycarbonate, polyvinyl chloride, polyethylene terephthalate and polyolefins, i.e. homopolymers and/or copolymers of ethylene, propylene, 1-butene and styrene, more particularly polyethylene and polypropylene and mixtures thereof. It was particularly surprising to find that a hydrophilic contact adhesive also produces adequate adhesion on polyethylene and polypropylene both immediately at the beginning of bonding and at the end thereof. The objects to be labeled may consist entirely of plastic, for example plastic containers, such as bottles, canisters, buckets, beakers etc. However, they may also have only one plastic surface and may otherwise consist of metal, glass or wood, for example tin cans, coated glass bottles, painted wood, etc.

Paper in the context of the invention is understood to be a sheet-form material which consists essentially of fibers of predominantly vegetable origin. The weight per unit area is generally up to 225 g/m2. However, it may even be higher (cardboard or paperboard). The paper may even be coated, for example with aluminium or a plastic layer. The particular requirements which papers for paper labels have to satisfy are discussed in the article by K Dullinger in "Etikettiertechnik von A bis Z" in Zeitschrift for Lebensmitteltechnik, 1987, pages 503 to 507.

A label is a piece of paper carrying information which is applied to an article. In most cases, it is made of paper but may also consist of plastic or both.

Accordingly, the adhesive according to the invention is eminently suitable for labeling, more particularly plastic surfaces. However, articles of metal, glass, wood and paperboard are also easy to label.

To apply paper labels to bottles of polyolefins, a) a 50% aqueous system is prepared from the adhesive according to the invention, b) the aqueous system is applied to paper labels in a quantity of 100 $g/m^2$, c) the adhesive-coated paper label is pressed onto the bottle while still moist (within 10 seconds) at temperatures of 10 to 40° C. and d) the adhering label is dried at room temperature.

In general, however, the adhesive according to the invention is used by a) applying an aqueous system, an organic solution or a melt of the adhesive according to the invention to at least one of the two substrates to be bonded, b) drying or cooling the coated substrate and c) pressing the dried or cooled substrate together with the second substrate to be bonded.

The contact adhesive according to the invention is distinguished by the following remarkable properties:

thermal stability of the aqueous formulation above 30° C., high adhesive strength of paper labels to polyolefin surfaces, such as PE or PP, usable in high-speed machines, substantial avoidance of stains as produced by fats, suitability for application by various methods, i.e. from the melt, as an aqueous system and as a solution in an organic solvent, solubility in water: up to 980 g adhesive/l water at 20° C., high early adhesion, even in the case of an aqueous system, without drying (high wet adhesive strength).

The invention is illustrated by the following Examples.

EXAMPLES

1. Production of the Polyurethane

Example 1

94 Parts by weight of polyethylene glycol (PU quality) with a molecular weight of 600 (PEG 600) and 3.9 parts by weight of 1,12-octadecanol are freed from water for 2 hours at 80° C./1 mbar. After addition of 38.5 parts by weight of Desmodur V44M (4,4'-MDI), the reaction temperature is increased to 90° C. while nitrogen is introduced. After a reaction time of about 3 hours, the NCO value has reached 0%. The substance now has a melt viscosity of about 97,000 mPas at 100° C. A 50% aqueous formulation has a solution viscosity of 82,000 mPas at 22° C.

Examples 2 to 6

The polyurethanes listed in Table 1 below were produced by the method described in Example 1.

In Table 1

TMP=trimethylol propane

PEG 3000=polyethylene glycol with a molecular weight of 3,000

PEG 6000=polyethylene glycol with a molecular weight of 6,000

Drivanil 25–250=high molecular weight EO/PO adduct

Lupranat MIS=MDI isomer mixture

Example 7

63.7 Parts by weight of PEG 600 are freed from water as in Example 1 and reacted with 21.8 parts by weight of 4,4'-MDI. After the NCO value has reached 0%, 10.6 parts by weight of TMXDI, 3.9 parts by weight of dimethylol propionic acid and 0.05 part by weight of dibutyl tin dilaurate are added and the mixture is left to react at 120° C. to maximum melt viscosity (NCO value 0%). The substance now has an acid value of 18 and a melt viscosity of 144,000 mPas at 130° C. 2.5 Parts by weight of a 50% by weight sodium hydroxide solution are added to 100 parts by weight of a 50% aqueous formulation. The PE/paper adhesive strength is given a—rating.

Example 8

59.9 Parts by weight of PEG 600 and 5.8 parts by weight of PEG 6000 are freed from water as in Example 1 and reacted with 20.6 parts by weight of 4,4'-MDI. After the NCO value has reached 0%, 10 parts by weight of TMXDI and 3.7 parts by weight of dimethylol propionic acid and 0.05 part by weight of dibutyl tin dilaurate are added and the mixture is left to react at 140° C. to maximum melt viscosity (NCO value 0%). The substance now has an acid value of 17.5 and a melt viscosity of 128,000 mPas at 140° C. 1.1 Part by weight of a 50% by weight sodium hydroxide solution are added to 100 parts by weight of a 50% aqueous formulation, after which the aqueous formulation has a solution viscosity of 160,000 mPas at 22° C. The PE/paper adhesive strength is given a + rating.

Example 9

56.5 Parts by weight of PEG 600 and 5.6 parts by weight of PEG 6000 are freed from water as in Example I and reacted with 20.2 parts by weight of 4,4'-MDI. After the NCO value has reached 0%, 9.9 parts by weight of TMXDI and 3.6 parts by weight of dimethylol propionic acid are added and the mixture is left to react at 125° C. until the NCO value has again reached 0%. The substance now has a melt viscosity of 118,000 mPas at 150° C. 1.3 Part by weight of a 50% by weight sodium hydroxide solution are added to 100 parts by weight of a 50% aqueous formulation, after which the aqueous formulation has a solution viscosity of 366,000 mPas at 22° C. The PE/paper adhesive strength is given a + rating.

Example 10

61.3 Parts by weight of PEG 600 and 5.5 parts by weight of PEG 6000 are freed from water as in Example 1 and reacted with 20.2 parts by weight of 4,4'-MDI. After the NCO value has reached 0%, 9.8 parts by weight of TMXDI and 3.2 parts by weight of N-methyl diethanolamine are added and the mixture is left to react at 110° C. until the NCO value has again reached 0%. The substance now has a melt viscosity of 26,000 mPas at 150° C. A 53% aqueous formulation has a solution viscosity of 60,000 mPas at 23° C. The PE/paper adhesive strength is given a + rating.

Example 11

61.4 Parts by weight of PEG 600, 6.9 parts by weight of PEG 6000 and 3.9 parts by weight of Dianol 340 are freed from water as in Example 1 and reacted with 25.6 parts by weight of 4,4'-MDI. After the NCO value has reached 0%, 2.3 parts by weight of succinic anhydride are added and the mixture is left to react at 1 10C until an acid value of 12 is reached. The substance now has a viscosity of 87,000 mPas at 110° C. A 54% aqueous formulation has a solution viscosity of 160,000 mPas at 23° C. The PE/paper adhesive strength is given a ++ rating.

Examples 12 to 38

The polyurethanes listed in Table 2 below were produced by the method described in Example 1.

TABLE 1

Composition and properties of the polyurethanes

| Example No. | Composition | Parts by weight | Melt viscosity [mPas] | Solution viscosity [mpas] | PE/paper adhesive strength |
|---|---|---|---|---|---|
| 1 | PEG 600/1,12-octadecanediol/Desmodur V44M | 69:3:28 | 32,000 (125° C.) | 82,000 | ++ |
| 2 | PEG 600/1,12-octadecanediol/TMP/Desmodur V44M | 66:4:1:29 | 19,000 (125° C.) | 60,000 | + |
| 3 | PEG 600/1,12-octadecanediol/PEG 3000/Desmodur V44M | 66.3:3.5:3.2:27 | 40,000 (90° C.) | 188,000 | + |
| 4 | PEG 600/1,12-octadecanediol/PEG 6000/Desmodur V44M | 64.8:2.7:6.6:25.9 | 69,000 (90° C.) | 158,000 | ++ |
| 5 | PEG 600/1,12-octadecanediol/Drivanil 25-250/Desmodur V44M | 65.3:3.5:3.3:27.9 | 150,000 (90° C.) | 960,000 | ++ |
| 6 | PEG 600/1,12-octadecanediol/Lupranat MIS | 67.2:2.9:29.9 | 134,000 (90° C.) | 140,000 | + |

TABLE 2

Composition and properties of the polyurethanes

| Example No. | Composition | Parts by weight | Melt viscosity [mPas] | Solution viscosity [mPas] | PE/paper adhesive strength |
|---|---|---|---|---|---|
| 12 | PEG 600/Pluronic PE 6400/Dianol 340/Desmodur V44M | 66:3:3:4:26.7 | 83,000 (90° C.) | 66,000 | + |
| 13 | PEG 600/Pluronic PE 6800/Dianol 340/Desmodur V44M | 63.6:6:6.9:3.9:25.6 | 90,000 (90° C.) | 66,000 | + |
| 14 | PEG 600/Pluronic PE 6400/Dianol 340/Desmodur V44M | 66.3:3:4:26.7 | 83,000 (90° C.) | 66,000 | + |
| 15 | PEG 600/Pluronic PE 9400/Dianol 340/Desmodur V44M | 65.7:3.8:5.1:25.5 | 28,000 (110° C.) | 20,000 | + |
| 16 | PEG 600/Pluronic PE 10500/Dianol 340/Desmodur V44M | 63.6:6.9:3.9:25.6 | 119,000 (90° C.) | 152,000 | + |
| 17 | PEG 600/PEG 6000/Dianol 240/Desmodur V44M | 63.9:6:6.9:3.5:25.7 | 124,000 (90° C.) | 27,000 | ++ |
| 18 | PEG 600/PEG 6000/Dianol 320/Desmodur V44M | 64.2:7:3:25.8 | 71,000 (110° C.) | 46,000 | ++ |
| 19 | PEG 600/PEG 6000/Dianol 340/Desmodur V44M | 63.6:6.9:3.9:25.6 | 74,000 (110° C.) | 96,000 | ++ |
| 20 | PEG 600/PEG 6000/PTHF 250/Desmodur V44M | 65:7:2:26 | 100,000 (90° C.) | 35,000 | + |
| 21 | PEG 600/PEG 6000/PTHF 650/Desmodur V44M | 63:6.7:5:25.3 | 70,000 (110° C.) | 100,000 | ++ |
| 22 | PEG 600/TMXDI | 72.5:27.5 | 7,500 (110° C.) | 800 | -- |
| 23 | PEG 600/PEG 6000/Dianol 340/Lupranat MIS | 61.6:6.5:7.6:26.8 | 16,000 (110° C.) | 58,000 | ++ |
| 24 | PEG 600/Pluronic PE 9400/Dianol 340/1,12-octadecanediol/Desmodur V44M | 64.2:5:3.7:1:25.5 | 74,000 (110° C.) | 24,000 | + |
| 25 | PEG 600/PEG 12000/PTHF 650/Desmodur V44M | 63.1:6.7:5:25.2 | 106,000 (90° C.) | 79,000 | ++ |
| 26 | PEG 600/PEG 6000/PTHF 250/Desmodur V44M | 61.2:6.5:4.9:27.4 | 139,000 (90° C.) | 108,000 | ++ |
| 27 | PEG 600/PEG 6000/PPG 2000/Desmodur V44M | 60.2:6:10.1:23.7 | 79,800 (110° C.) | 124,000 | − |
| 28 | PEG 600/Desmodur V44M | 73:27 | 102,000 (110° C.) | 28,000 | ++ |
| 29 | PEG 600/PEG 6000/Desmodur V44M | 68:6.7:25.3 | 140,000 (110° C.) | 150,000 | ++ |
| 30 | PEG 600/PEG 6000/1,12-octadecanediol/Desmodur V44M | 64:6.7:2.7:26.6 | 89,000 (110° C.) | 380,000 | ++ |
| 31 | PEG 600/PEG 6000/4,8-bis(hydroxymethyl)tricyclo[5.2.1.0$^{2,6}$]decane/Desmodur V44M | 61.9:6.6:4:27.5 | 96,600 (110° C.) | 44,800 | ++ |
| 32 | PEG 600/Pluronic PE 6800/Dianol 340/Desmodur V44M | 55.7:17.2:4.1:23 | 26,000 (110° C.) | 31,000 | + |
| 33 | PEG 600/PEG 6000/4,4'-usisopropylidene dicyclohexanol/Desmodur V44M | 62.4:6.6:4:27 | 101,000 (110° C.) | >1,000,000 | ++ |
| 34 | PEG 600/PEG 6000/PTHF 1000/Desmodur V44M | 55.6:10.5:10.5:23.4 | 74,000 (100° C.) | 156,000 | + |
| 35 | PEG 600/PEG 6000/1,12-dodecanediol/Desmodur V44M | 60.3:10.1:3.4:26.2 | 91,000 (110° C.) | 216,000 | ++ |
| 36 | PEG 600/PEG 6000/Dianol 340/1,12-dodecanediol/Desmodur V44M | 53.7:10.8:5.4:3:27.1 | 119,000 (110° C.) | >1,000,000 | + |
| 37 | PEG 600/PEG 6000/Dianol 340/Desmodur V44M | 5:52.4:9.8:5:27.8 | 83,000 (110° C.) | 290,000 | ++ |
| 38 | PEG 600/PEG 6000/PTHF 250/Dianol 340/Desmodur V44M | 51.6:10.3:5.1:5.1:27.9 | 143,000 (120° C.) | >1,000,000 | ++ |

In Table 2:

Dianol 240=adduct of 4 moles ethylene oxide with bisphenol A

Dianol 320=adduct of 2 moles propylene oxide with bisphenol A

Dianol 340=adduct of 4 moles propylene oxide with bisphenol A

PTHF 250=polytetrahydrofuran with an average molecular weight of 250

PTHF 650=polytetrahydrofuran with an average molecular weight of 650

PTHF 1000=polytetrahydrofuran with an average molecular weight of 1000

PEG 200=polyethylene glycol with an average molecular weight of 200

Pluronic PE 6400=EOx-POy-EOz block copolymer with an average molecular weight of the polypropylene oxide block of 1750 and a percentage polyethylene oxide content in the molecule as a whole of 40

Pluronic PE 6800=EOx-POy-EOz block copolymer with an average molecular weight of the polypropylene oxide block of 1750 and a percentage polyethylene oxide content in the molecule as a whole of 80

Pluronic PE 9400=EOx-POy-EOz block copolymer with an average molecular weight of the polypropylene oxide block of 2750 and a percentage polyethylene oxide content in the molecule as a whole of 40

Pluronic PE 10500=EOx-POy-EOz block copolymer with an average molecular weight of the polypropylene oxide block of 3250 and a percentage polyethylene oxide content in the molecule as a whole of 50

TMXDI=tetramethylene xylylene diisocyanate

2. Properties and Applications

All the adhesives retained their contact adhesion property for more than 6 months. They were all soluble in water at 20° C. over 24 hours, i.e. more than 30 g and preferably more than 40 g dissolved in 100 g of water.

The coated glass plate could be repeatedly bonded. The degree of crystallization was below 20%.

The following adhesion tests were carried out:

a) Paper was coated with an aqueous solution of 500 g of adhesive/l (100 g of adhesive/m² of paper). After drying (20° C., 65% relative air humidity, 48 hours), the pieces were applied under light pressure to the glass plates. Adhesive strength was determined after 2 days.

b) The same paper was coated with the same aqueous solution as in a). However, a second piece, of paper was applied immediately, i.e. without drying, to the first under light pressure.

c) A glass plate was coated with the water-free adhesive system at 100° C. to 160° C.

3. Measuring Processes a) Solution viscosity (50% in deionized water): Brookfield (spindle 7; 20 r.p.m.) at 22° C.

b) Melt viscosity: ICI cone and plate, Brookfield CAP 2000 VISCOSI-METER.

c) Application of paper labels to polyethylene bottles from aqueous solution as in adhesion test 2b). After storage for 3 days at 20° C./65% relative air humidity, adhesive strength was determined by manually peeling off the labels. The samples were classified as follows according to the force applied: ++= adhesive strength high, += adhesive strength medium, − adhesive strength poor, − no adhesive strength.

d) To determine the degree of crystallization by the DSC method, a 2 ml sample of the reaction product is taken at about 80 to 100° C. and at an NCO content of 0%, cooled at 20° C. and then stored for 24 hours. The measurement is then carried out in the usual way. First, a sample is encapsulated in an aluminium crucible (nitrogen stream through the sample chamber). The sample is then heated from −50 to 150° C. at a rate of 10.0° C. per minute and a measurement is carried out every second. Two runs are carried out. PEG 6000 is used for comparison. The degree of crystallization in % is derived by putting the enthalpy of fusion of the peg 6000, as measured in mJ/mg, at 100% and comparing the fusion enthalpy of the polyurethane therewith.

What is claimed is:

1. An adhesive composition comprising: a polyurethane comprising a reaction product of
   a) at least one diisocyanate; and
   b) at least one low molecular weight polyethylene glycol, wherein, said polyethylene glycol has a molecular weight $M_z$ up to 2,000, and;
   wherein, said polyurethane has a degree of crystallization of less tan 20 percent, as measured by a DSC method, based on a degree of crystallization of polyethylene glycol 6000 as a standard, is permanently tacky and is water-soluble or dispersible in water, wherein, said low molecular weight polyethylene glycol is partly replaced by at least one polyol selected from the group consisting of:
   a) up to 50 percent by weight of a block or statistical copolymer of ethylene oxide;
   b) up to 20 percent by weight of a hydrophobic aliphatic or cycloaliphatic diol;
   c) up to 10 percent by weight of hydrophobic homopolymeric polyalkylene glycols, wherein the alkylene group in said glycols contains more than 2 carbon atoms and said glycols have a molecular weight of from 150 to 10,000;
   d) up to 40 percent by weight of polyethylene glycol with a molecular weight of from 2,000 to 40,000;
   e) up to 5 percent by weight of triols; and
   f) up to 5 percent by weight of ion-forming diols,
   said percentages shown representing percent by weight, based on the total weight of said polyethylene glycol and polyols and; wherein, the diisocyanate can contain up to 50% by weight of TMXDI based on the weight of the diisocyanate.

2. The adhesive of claim 1 wherein said polyurethane has an Epprecht melt viscosity of more than 5 Pas at 110° C.

3. The adhesive of claim 2 wherein said polyurethane has an Epprecht melt viscosity of more than 30 Pas at 110° C.

4. The adhesive of claim 1 wherein a 50 percent by weight aqueous solution has a viscosity of greater than 10,000 mPas, at 20° C. as measured by a Brookfield method.

5. The adhesive of claim 3 wherein a 50 percent by weight aqueous solution has a viscosity of greater than 20,000 mPas, at 20° C. as measured by a Brookfield method.

6. The adhesive of claim 1 wherein said diisocyanate comprises 50 percent by weight or greater of an aromatic diisocyanate, and up to 50 percent by weight of aliphatic or cycloaliphatic diisocyanates.

7. The adhesive of claim 6 wherein said aromatic diisocyanate comprises MDI.

8. The adhesive of claim 1 wherein said polyethylene glycol is partly replaced by a polyol selected from the group consisting of:
   0.5–30 percent by weight of a block or statistical copolymer of ethylene oxide;
   b) up to 10 percent by weight of a hydrophobic aliphatic or cycloalipbatic diol;
   c) up to 10 percent by weight of hydrophobic homopolymeric polyalkylene glycols, wherein the alkylene group in said glycols contains more than 2 carbon atoms;
   d) up to 40 percent by weight of polyethylene glycol with a molecular weight of from 2,000 to 40,000;
   e) 0.2–2 percent by weight of triols;
   f) up to 5 percent by weight of ion-forming diols; and
   g) mixtures thereof.

9. The adhesive of claim 8 wherein said polyethylene glycol is partly replaced by at least one polyol selected from the group consisting of:
   a) 0.7–20 percent by weight of a block or statistical copolymer of ethylene oxide;
   b) up to 5 percent by weight of a hydrophobic aliphatic or cycloaliphatic diol;
   c) 0.5–5 percent by weight of hydrophobic homopolymeric polyalkylene glycols, wherein the alkylene group in said glycols contains more than 2 carbon atoms;
   d) up to 40 percent by weight of polyethylene glycol with a molecular weight of from 2,000 to 40,000;
   e) 0.2–2 percent by weight of triols;
   f) up to 5 percent by weight of ion-forming diols; and
   g) mixtures thereof.

10. The adhesive of claim 9 wherein said polyethylene glycol is partly replaced by at least one polyol selected from the group consisting of;
    a) 1–10 percent by weight of a block or statistical copolymer of ethylene oxide;
    b) up to 5 percent by weight of a hydrophobic aliphatic or cycloaliphatic diol;
    c) 0.5–5 percent by weight of hydrophobic homopolymeric polyalkylene glycols, wherein the alkylene group in said glycols contains more than 2 carbon atoms;
    d) up to 40 percent by weight of polyethylene glycol with a molecular weight of from 2,000 to 40,000;
    e) 0.2–2 percent by weight of triols;
    f) up to 5 percent by weight of ion-forming diols; and
    g) mixtures thereof.

11. The adhesive composition of claim 1 further comprising solubilizers, antioxidants, preservatives, and mixtures thereof.

12. An aqueous solution or dispersion comprising the composition of claim 1 and up to 98 percent by weight of water.

13. An aqueous solution or dispersion comprising the composition of claim 1 and 20–80 percent by weight of water.

14. An aqueous solution or dispersion comprising the composition of claim 1 and 30–70 percent by weight of water.

15. An aqueous adhesive system comprising:
    a) 30 to 90 percent by weight of said polyurethane of claim 1;

b) 0 to 35 percent by weight of dispersion adhesives;

c) 0 to 10 percent by weight of solubilizers;

d) 0 to 10 percent by weight of viscosity controllers;

e) 0 to 5 percent by weight of filler; and f) 0 to 0.5 percent by weight of preservative.

16. A hotmelt adhesive comprising:

a) 50 to 100 percent by weight of said polyurethane of claim 1;

b) 0 to 30 percent by weight of tackifiers; and c) 0 to 30 percent by weight of waxes.

17. A process for the production of the adhesive of claim 1 comprising adding said polyisocyanate to the polyol in a melt at from 70 to 200° C.

18. A process for labeling comprising applying a label to a surface using the adhesive composition of claim 1.

19. The process of claim 18 wherein said surface is a plastic surface.

20. A process for applying paper labels to bottles of polyolefins, comprising:

a) preparing an aqueous system comprising 50 percent by weight of the adhesive composition of claim 1;

b) applying said aqueous system to said paper label in a quantity of 100 g/ml;

c) pressing said moistened paper label onto the bottle while still moist (within 10 seconds) at temperatures of 10 to 40° C.; and d) drying said label at room temperature.

21. A process for bonding substrates comprising:

a) preparing a composition selected from the group consisting of an aqueous system, an organic solution or a melt comprising said adhesive of claim 1;

b) applying said composition to at least one of two substrates to be bonded;

c) drying or cooling said coated substrate; and d) pressing said coated substrate together with the second substrate to be bonded.

* * * * *

UNITED STATES PATENT AND TRADEMARK OFFICE
CERTIFICATE OF CORRECTION

PATENT NO. : 6,630,050 B1
DATED : October 7, 2003
INVENTOR(S) : Moeller et al.

It is certified that error appears in the above-identified patent and that said Letters Patent is hereby corrected as shown below:

Column 15,
Line 30, delete "tan" and insert therefore -- than --.

Column 16,
Line 8, before "0.5-30", insert -- a) --.
Line 11, delete "cycloalipbatic" and insert therefore -- cycloaliphatic --.

Signed and Sealed this

Second Day of August, 2005

JON W. DUDAS
*Director of the United States Patent and Trademark Office*